United States Patent [19]
Yamada et al.

[11] 3,771,825
[45] Nov. 13, 1973

[54] GRIPPING MECHANISM FOR MANIPULATOR

[75] Inventors: Tominori Yamada, Tamano; Syugo Douno, Hyogo, both of Japan

[73] Assignees: Mitsui Shipbuilding and Engineering Co. Ltd., Tokyo; Glory Kogyo Kabushiki Kaisha, Hyogo, both of Japan

[22] Filed: Sept. 9, 1971

[21] Appl. No.: 178,861

[30] Foreign Application Priority Data
Sept. 16, 1970 Japan.............................. 45/81062

[52] U.S. Cl................................ 294/88, 294/106
[51] Int. Cl.............................................. B66c 1/48
[58] Field of Search ................... 294/81, 88, 27, 28, 294/29, 30, 31, 106, 113, 115, 119, 67 BC; 214/658

[56] References Cited
UNITED STATES PATENTS
3,237,980   3/1966   Helms........................... 294/106 X
3,040,921   6/1962   Davis................................ 294/88 X
3,312,496   4/1967   Boutelle et al....................... 294/66

FOREIGN PATENTS OR APPLICATIONS
1,307,942   9/1962   France........................... 294/67 BC
1,948,533   4/1971   Germany..........................294/88

Primary Examiner—Evon C. Blunk
Assistant Examiner—Johnny D. Cherry
Attorney—Dexter N. Shaw et al.

[57] ABSTRACT

A gripping mechanism capable of gripping a large size plate on the side portion thereof. The mechanism has a number of gripping members and the gripping members are arranged in zigzag relation at one side, and the opposite gripping members are in staggered relation.

1 Claim, 3 Drawing Figures

GRIPPING MECHANISM FOR MANIPULATOR

The present invention relates to a gripping mechanism suitable mainly for handling a plate-like material.

Handling of a plate-like material by means of a manipulator is generally to grip a plate-like material for hanging and transporting it to a predetermined location and to hold it at fixed position to secure it to an object by welding or bolt-fastening.

The present invention has for its object to provide a mechanism which can grip firmly an article, such a plate-like material as can not be gripped at a center of gravity thereof.

Figure 1:
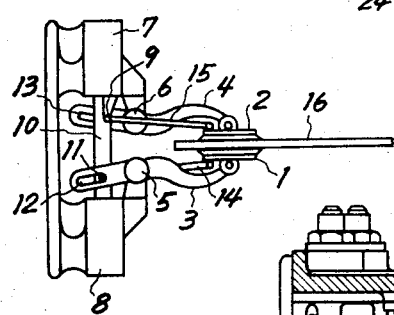
FIG. 1 is a front view showing a gripping mechanism for a manipulator.

Referring now to FIG. 1, levers 3 and 4 having gripping plates 1, 2 on their free ends respectively are supported by pins 5 and 6. The levers are adapted to be rocked by a pair of two hydraulic cylinders 7 and 8. In the hydraulic cylinder is inserted a common piston rod 10 on which pin 11 slidably engages with a slot 12 of the lever 3. A pin of a common piston rod of the other opposite cylinders (not shown) is engaged with a slot 13 of the lever 4. Auxiliary links 14 and 15 are connected to the gripping plates 1 and 2, each link being rotatably supported at a suitable position by a pin 9.

Accordingly, movements of the piston rods cause rocking movements of the levers 3 and 4 so that the gripping plates 1 and 2 grip the plate 16. When gripping a large-size plate material, this mechanism can not grip the plate at a center of gravity, because the gripping plates can not reach to the center. In this case, if the piston is positioned horizontally and a plate material is gripped keeping vertical attitude, there is no problem. However, if the piston is positioned vertically, accordingly a plate material is in a horizontal attitude as shown in FIG. 1, there occurs a great moment on a plate material, thus making it difficult to maintain it against the moment. The mechanism of the present invention can reliably grip a large plate.

Figure 2:
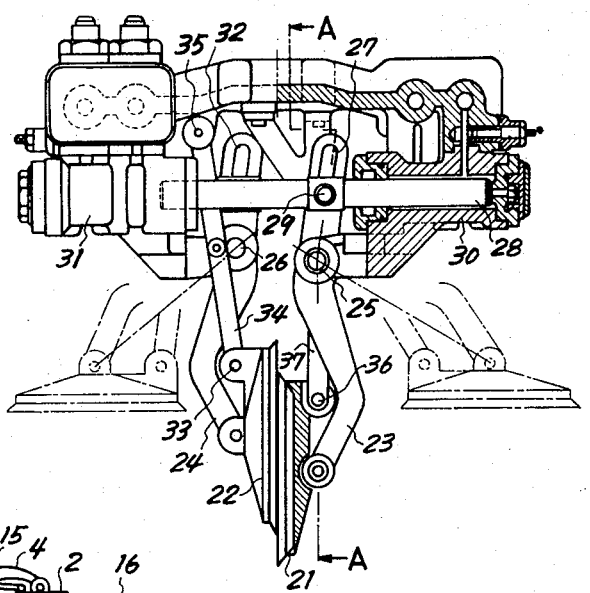
FIG. 2 is a front view showing an embodiment of the present invention.
Figure 3:
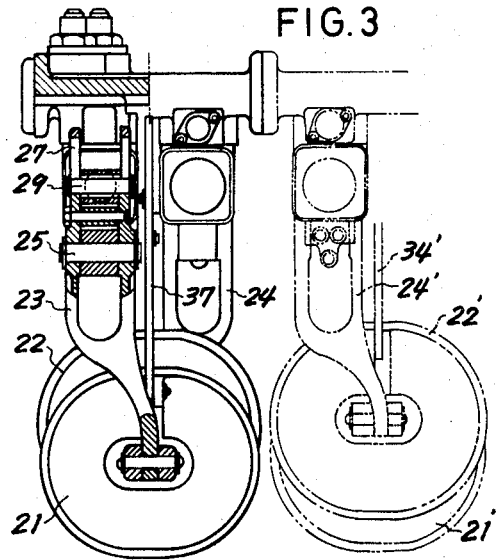
FIG. 3 is a sectional view taken along the line A—A of FIG. 2.

Referring now to FIGS. 2 and 3, levers 23 and 24 provided with gripping plates 21 and 22 at their free ends respectively are supported rotatably to the machine body by pins 25 and 26. A slot 27 of the lever 23 is slidably engaged with a pin 29 secured to a rod 28. This rod 28 is slidably inserted into a pair of hydraulic cylinders 30 and 31 and is designed to move by means of the hydraulic pressure. A slot 32 of the lever 24 is slidably engaged with a pin secured to a rod of which belongs to another hydraulic cylinder (not shown). An auxiliary link 34 pivotally connected to the gripping plate 22 by a pin 33 is rotatably supported to the machine body by a pin 35, while an auxiliary link 37 connected to another gripping plate 21 by a pin 36 is supported to the machine body by another pin (not shown). The levers 23 and 24 are different in length, so that gripping plates 21, 22 are in different levels.

A number of such pair of gripping mechanisms are arranged in juxtaposition, and each pair of gripping mechanism is so arranged that both long and short levers are constructed in the reverse relation with respect to the adjacent mechanism, as shown by a dotted line in FIG. 3. In the drawing, same reference numerals are used to similar parts to the left side mechanism with a prime added thereto. Thus, the gripping plates are arranged in a staggered relation. The ratio between the levers 23 and 24' and the length of the auxiliary link will be determined in such a manner that the gripping plates on the same side always move and grip in one and same plane.

In accordance with the present invention, the gripping plates are in staggered relation and, thereby can safely and firmly grip even a plate like material in any style. Further, if gripping plates are replaced with a vacuum pad or electro-magnet, it can be used for all possible shapes of materials.

What is claimed is:

1. A gripping mechanism for a manipulator having a machine body and comprising a plurality of pairs of opposed gripping members, a like number of pairs of gripping arms pivoted to said body in side-by-side relation for pivotal displacement between closed gripping and open release positions respectively, each pair being provided with a long arm and a short arm pivoted at their free ends to said opposed gripping members respectively, said members in the closed gripping position confronting one another and being offset or staggered by the different lengths of arms, the opposed members of every pair adapted to engage the surfaces on the opposite sides of said workpiece, auxiliary links connected between said gripping members and said machine body, and hydraulic mechanism to swing said arms, said pairs of gripping arms being arranged in juxtaposition in such a manner that said long and short arms alternate on each side of said workpiece and said auxiliary links dispose all of said members parallel to one another when the hydraulic mechanisms swing said members to their closed positions against the opposite surfaces of the workpiece, said arms and links being arranged to swing said members ninety degrees to their open positions and to dispose all of said members coplanar in said open positions, the members on the same side of the workpiece thereby moving in the same plane.

* * * * *

UNITED STATES PATENT OFFICE
CERTIFICATE OF CORRECTION

Patent No. 3,771,825                     Dated November 13, 1973

Inventor(s) Tominori Yamada and Syugo Douno

It is certified that error appears in the above-identified patent and that said Letters Patent are hereby corrected as shown below:

At the end of the Abstract, the following sentence should be added: --The members in the zig zag relation on one side of the workpiece remain coplanar as they are moved between open and closed positions respectively.--

Column 1, line 16, after "a" insert --conventional--;

Column 1, line 17, after "view" insert --partially in section--;

Column 1, line 53, after "pressure" insert --between the closed gripping position shown in full lines in Fig. 2 and the open release position shown in broken lines--;

Column 2, line 7, "in" should be deleted and --coplanar but at-- added;

Column 2, line 7, after "levels" the following should be added: --when in the closed position, and are coplanar at the same level when in the open position--.

Signed and sealed this 7th day of May 1974.

(SEAL)
Attest:

EDWARD M. FLETCHER, JR.                C. MARSHALL DANN
Attesting Officer                      Commissioner of Patents